US010821687B2

(12) United States Patent
Kim et al.

(10) Patent No.: US 10,821,687 B2
(45) Date of Patent: Nov. 3, 2020

(54) METHOD FOR PRODUCING HOLLOW CARBON CAPSULES

(71) Applicant: LG CHEM, LTD., Seoul (KR)

(72) Inventors: In Young Kim, Daejeon (KR); Jin Yeong Lee, Daejeon (KR); Kwon Nam Sohn, Daejeon (KR); Eui Yong Hwang, Daejeon (KR); Won Jong Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 382 days.

(21) Appl. No.: 15/512,694

(22) PCT Filed: Sep. 30, 2015

(86) PCT No.: PCT/KR2015/010295
§ 371 (c)(1),
(2) Date: Mar. 20, 2017

(87) PCT Pub. No.: WO2016/052981
PCT Pub. Date: Apr. 7, 2016

(65) Prior Publication Data
US 2017/0305082 A1 Oct. 26, 2017

(30) Foreign Application Priority Data

Sep. 30, 2014 (KR) .......... 10-2014-0131859
Sep. 30, 2014 (KR) .......... 10-2014-0131860
Sep. 25, 2015 (KR) .......... 10-2015-0137058

(51) Int. Cl.
B29C 71/02 (2006.01)
C01B 32/05 (2017.01)
(Continued)

(52) U.S. Cl.
CPC ............ B29C 71/02 (2013.01); B01J 13/043 (2013.01); C01B 32/05 (2017.08); C01B 32/174 (2017.08);
(Continued)

(58) Field of Classification Search
CPC ....... B29C 71/02; C01B 32/158; B01J 13/043
See application file for complete search history.

(56) References Cited

U.S. PATENT DOCUMENTS 8,057,774 B2   11/2011   Kim et al.
8,986,838 B2   3/2015    Kamegawa et al.
(Continued)

FOREIGN PATENT DOCUMENTS

CN   101910060 A   12/2010
CN   101703915 B   7/2011
(Continued)

OTHER PUBLICATIONS

Paunov, V. N. "Fabrication of carbon nanotube-based microcapsules by a colloid templating technique." Nanotechnology 16.9 ( 2005): 1522. (Year: 2005).*
(Continued)

Primary Examiner — Galen H Hauth
(74) Attorney, Agent, or Firm — Dentons US LLP

(57) ABSTRACT

The present invention relates to a method of producing hollow carbon capsules which can simply and effectively produce hollow carbon capsule by using polymer particles as soft templates and using a spray-drying method.

11 Claims, 9 Drawing Sheets

(51) Int. Cl.
*C01B 32/174* (2017.01)
*B01J 13/04* (2006.01)
*B29L 22/00* (2006.01)
*B82Y 30/00* (2011.01)
*B82Y 40/00* (2011.01)

(52) U.S. Cl.
CPC ........... *B29L 2022/00* (2013.01); *B82Y 30/00* (2013.01); *B82Y 40/00* (2013.01); *C01P 2004/34* (2013.01); *C01P 2006/16* (2013.01); *Y10S 977/742* (2013.01); *Y10S 977/842* (2013.01)

(56) References Cited

U.S. PATENT DOCUMENTS

| | | |
|---|---|---|
| 2003/0026980 A1 | 2/2003 | Takeda et al. |
| 2003/0039829 A1 | 2/2003 | Takeda et al. |
| 2003/0039830 A1 | 2/2003 | Takeda et al. |
| 2009/0087372 A1* | 4/2009 | Buchholz ............... C01B 32/162 423/447.2 |
| 2009/0304570 A1 | 12/2009 | Kim et al. |
| 2010/0304141 A1 | 12/2010 | Kamegawa et al. |
| 2011/0300447 A1* | 12/2011 | Archer .................. B82Y 30/00 429/231.8 |
| 2013/0084455 A1 | 4/2013 | Naskar et al. |
| 2014/0178262 A1 | 6/2014 | Tran et al. |
| 2017/0033360 A1* | 2/2017 | Michaud ............... H01M 4/366 |

FOREIGN PATENT DOCUMENTS

| | | |
|---|---|---|
| JP | 05-254814 A | 10/1993 |
| JP | 2003-048705 A | 2/2003 |
| JP | 2009-155199 A | 7/2009 |
| JP | 2010-168251 A | 8/2010 |
| JP | 2012-101950 A | 5/2012 |
| KR | 10-2003-0068765 A | 8/2003 |
| KR | 10-2004-0064056 A | 7/2004 |
| KR | 10-2008-0053229 A | 6/2008 |
| KR | 10-0924214 B1 | 10/2009 |
| KR | 10-2009-0126058 A | 12/2009 |
| KR | 10-1207624 B1 | 12/2012 |

OTHER PUBLICATIONS

Tang, et al.: "Hollow Carbon Nanospheres with a High Rate Capability for Lithium-Based Batteries", Chem. Sus. Chem., Jan. 19, 2012, pp. 400-403.

Kadla et al., "Novel Hollow Core Fibers Prepared from Lignin Polypropylene Blends," Journal of Applied Polymer Science, 2002, vol. 85, pp. 1353-1355.

Kisakibaru, Yutaka et al., "Preparation of porous carbon particles using a spray-drying method with colloidal template," International Journal of Chemical and Biological Engineering, 2012, vol. 6, pp. 57-60.

Ogi, Takashi et al., "Synthesis of nanostructured carbon particle materials via spray method," Proceedings of AIChE conference, Nov. 3, 2013-Nov. 8, 2013, San Francisco, CA. Obtained from the following site: <http://www3.aiche.org/Proceedings/content/Annual-2013/extended-abstracts/P334484.pdf>.

Hong, Jinkee et al., "Hollow capsules of reduced graphene oxide nanosheets assembled on a sacrificial colloidal particle", J. Phys. Chem. Lett., 2010, vol. 1, No. 24, pp. 3442-3445.

Nandiyanto, Asep Bayu Dani et al.. "Synthesis of additive-free cationic polystyrene particles with controllable size for hollow template applications," Colloids and Surfaces A: Physicochem. Eng. Aspects 2012, vol. 396, pp. 96-105.

Balgis, Ratna et al., "Self-organized macroporous carbon structure derived from phenolic resin via spray pyrolysis for high-performance electrocatalyst," ACS Applied Materials & Interfaces, 2013, vol. 5, pp. 11944-11950.

New Carbon Materials, 2011, 26(5), pp. 389-395.

J. Am. Chem. Soc., 2010, 132 (49), pp. 17360-17363.

Current Applied Physics, vol. 8, No. 6, 814-817, 2008.

Carbon 49 (2011) 2163-2172.

World Academy of Science, Engineering and Technology vol. 6, No. 1, 2012.

* cited by examiner

[Fig. 1]
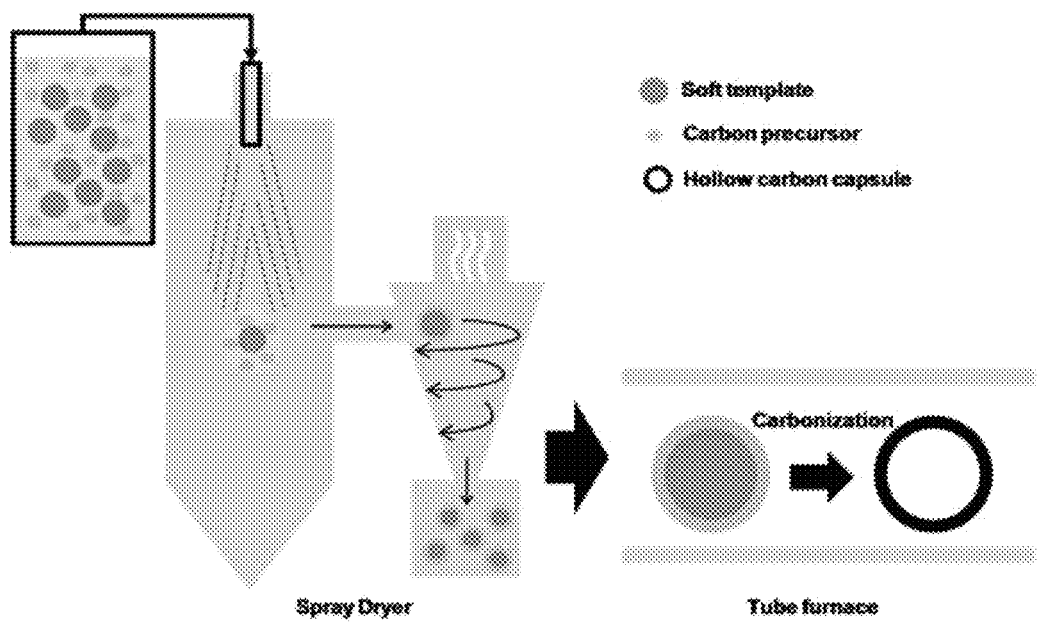

[Fig. 2]
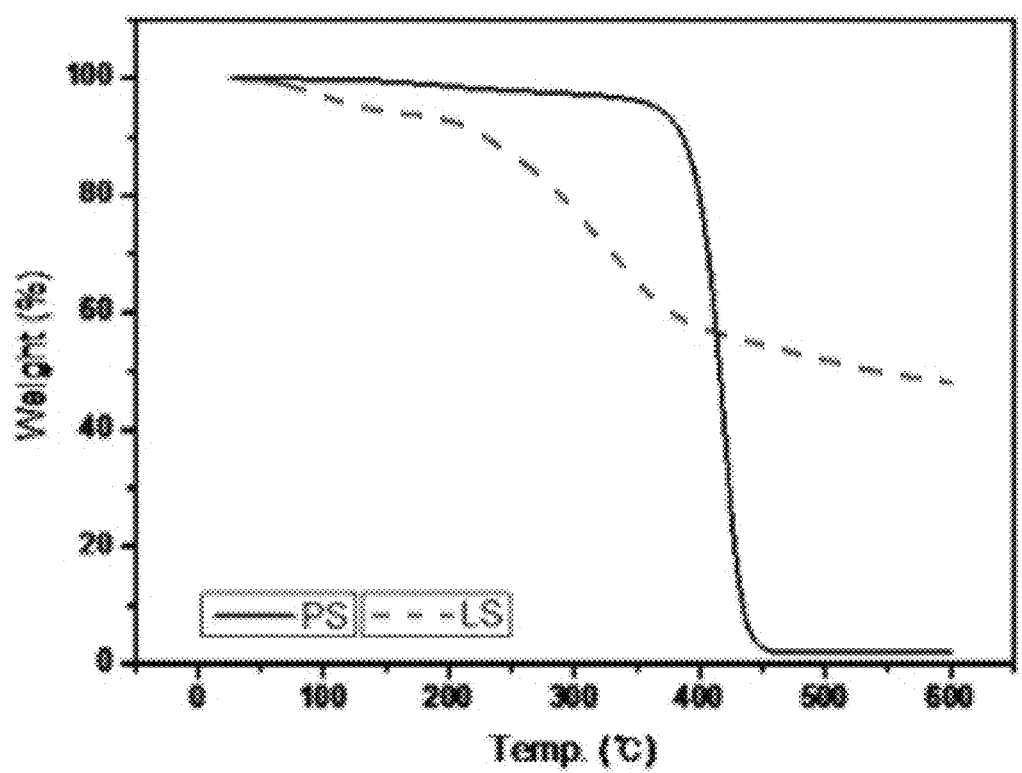

[Fig. 3]
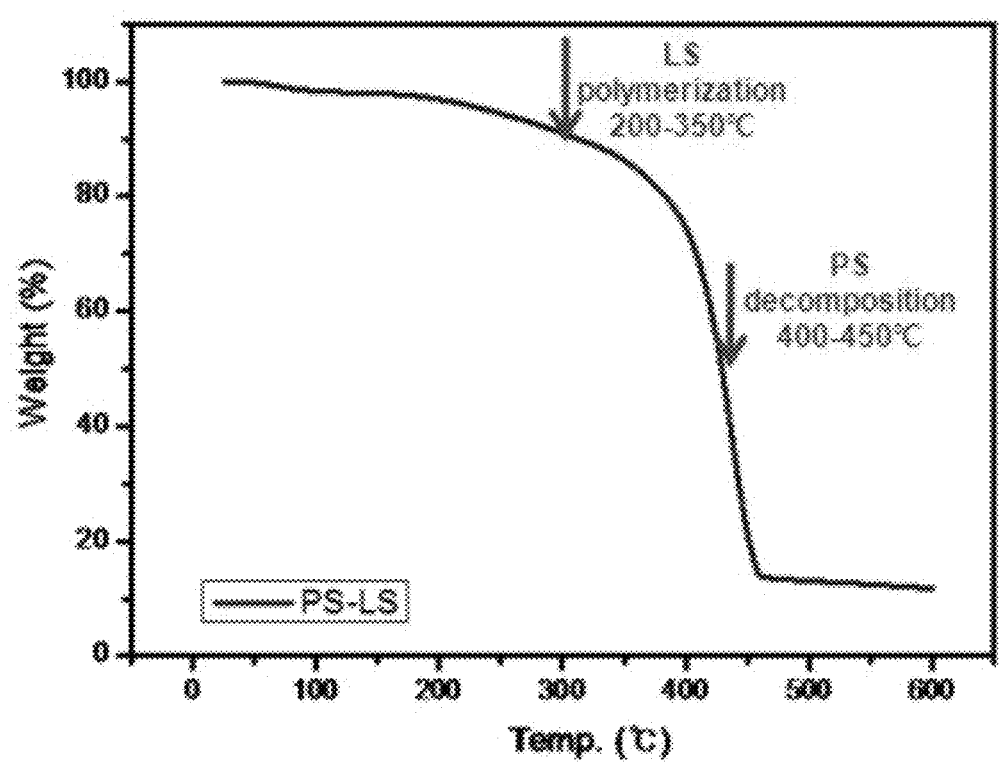

[Fig. 4a]
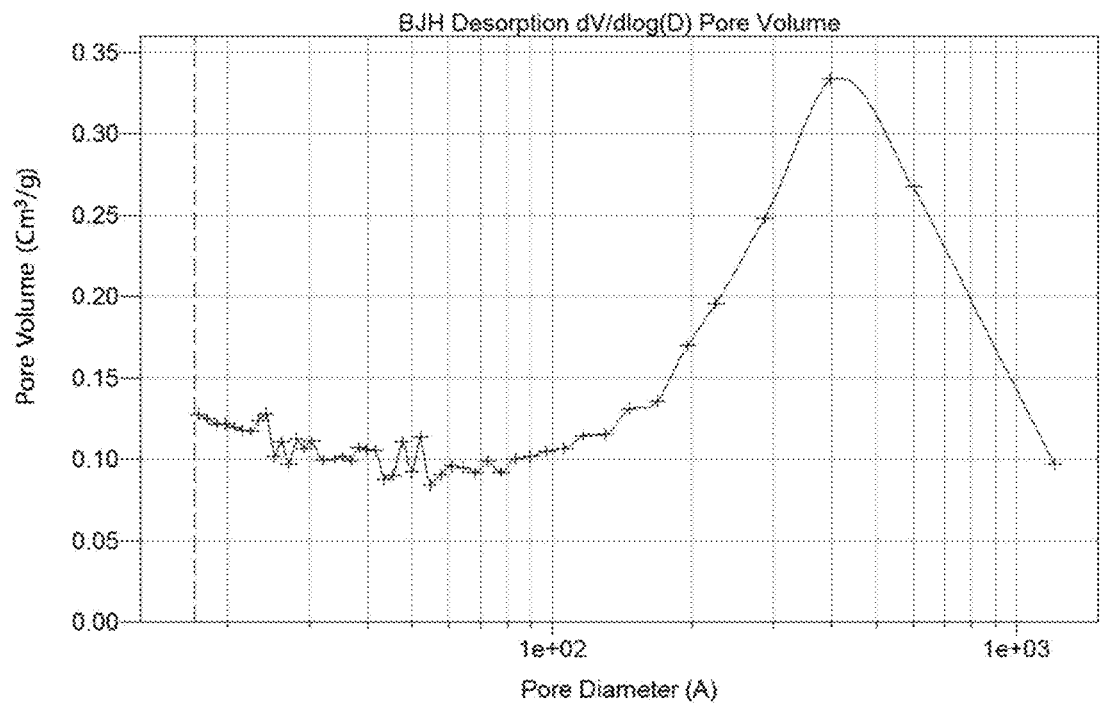
[Fig. 4b]
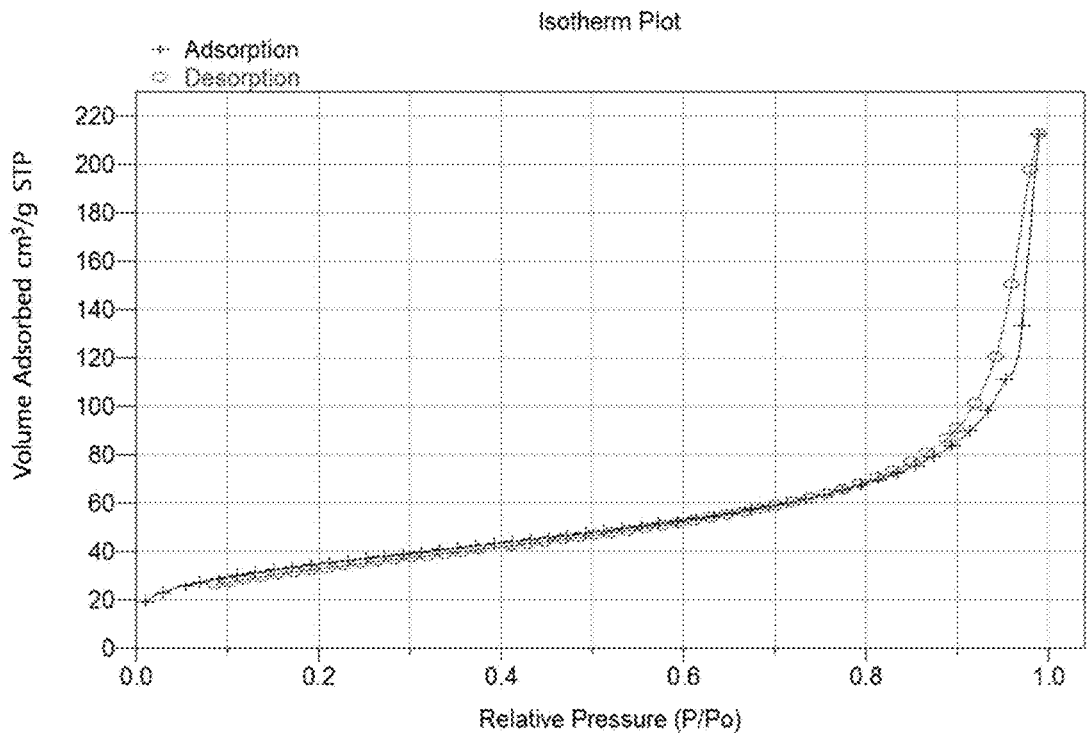

[Fig. 5]
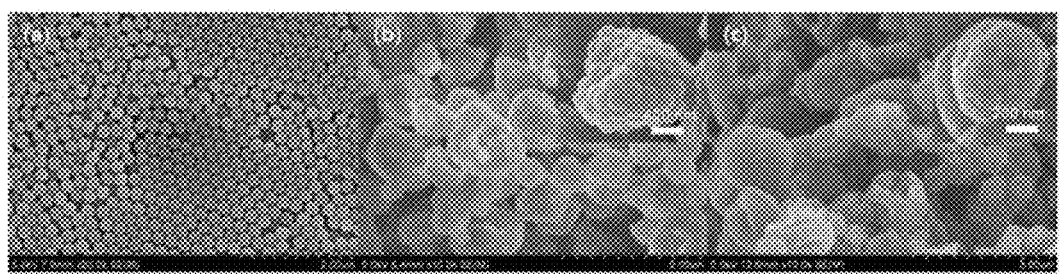
[Fig. 6]
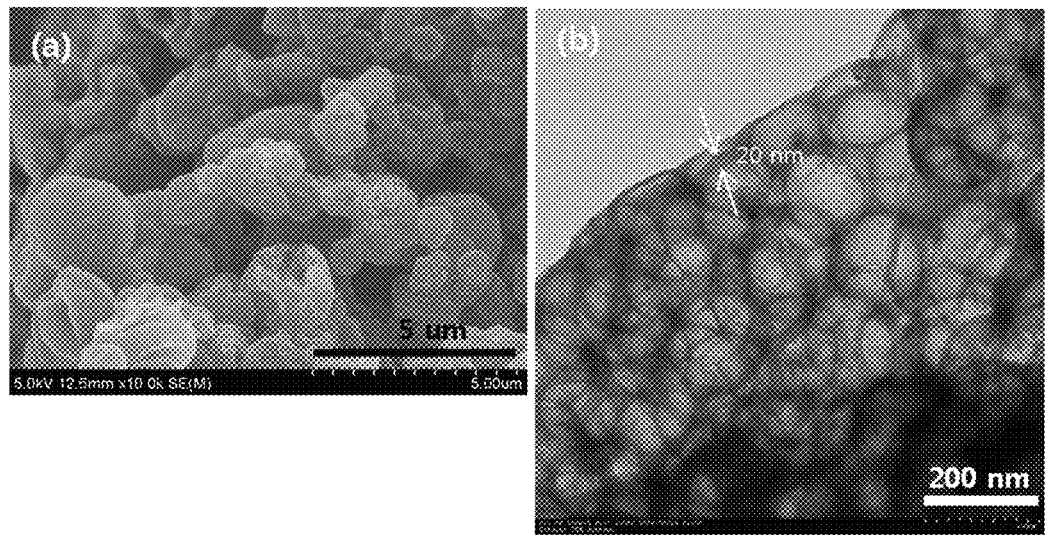

[Fig. 7]
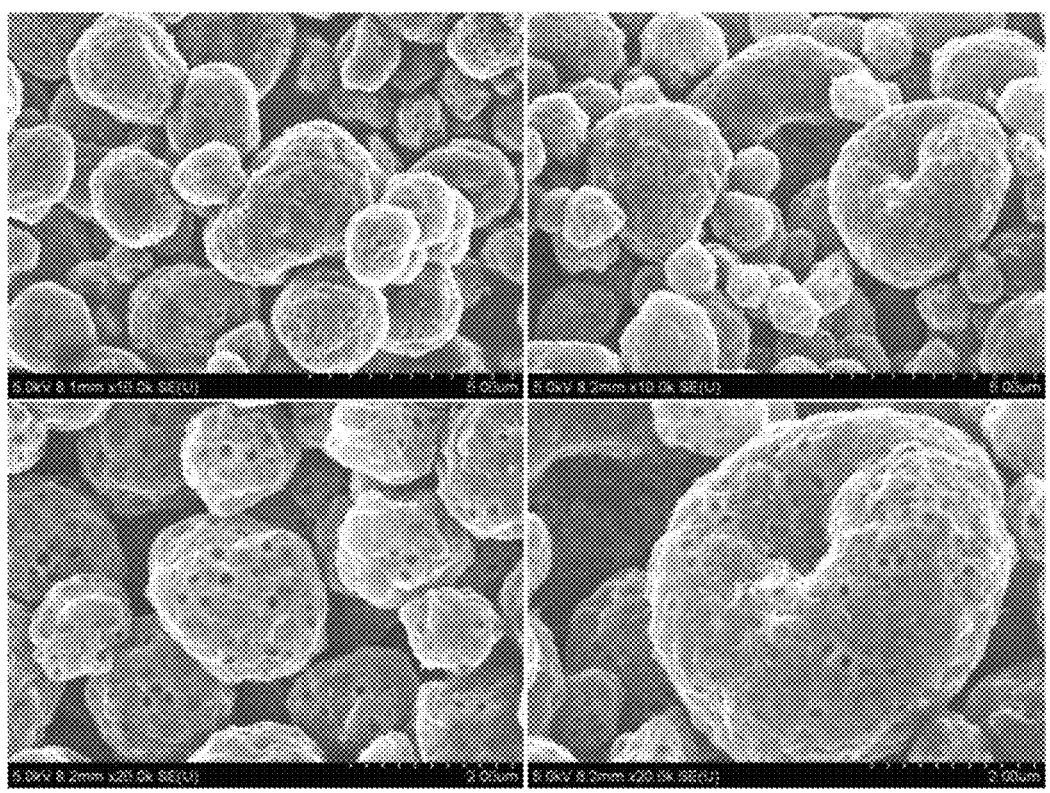

[Fig. 8]
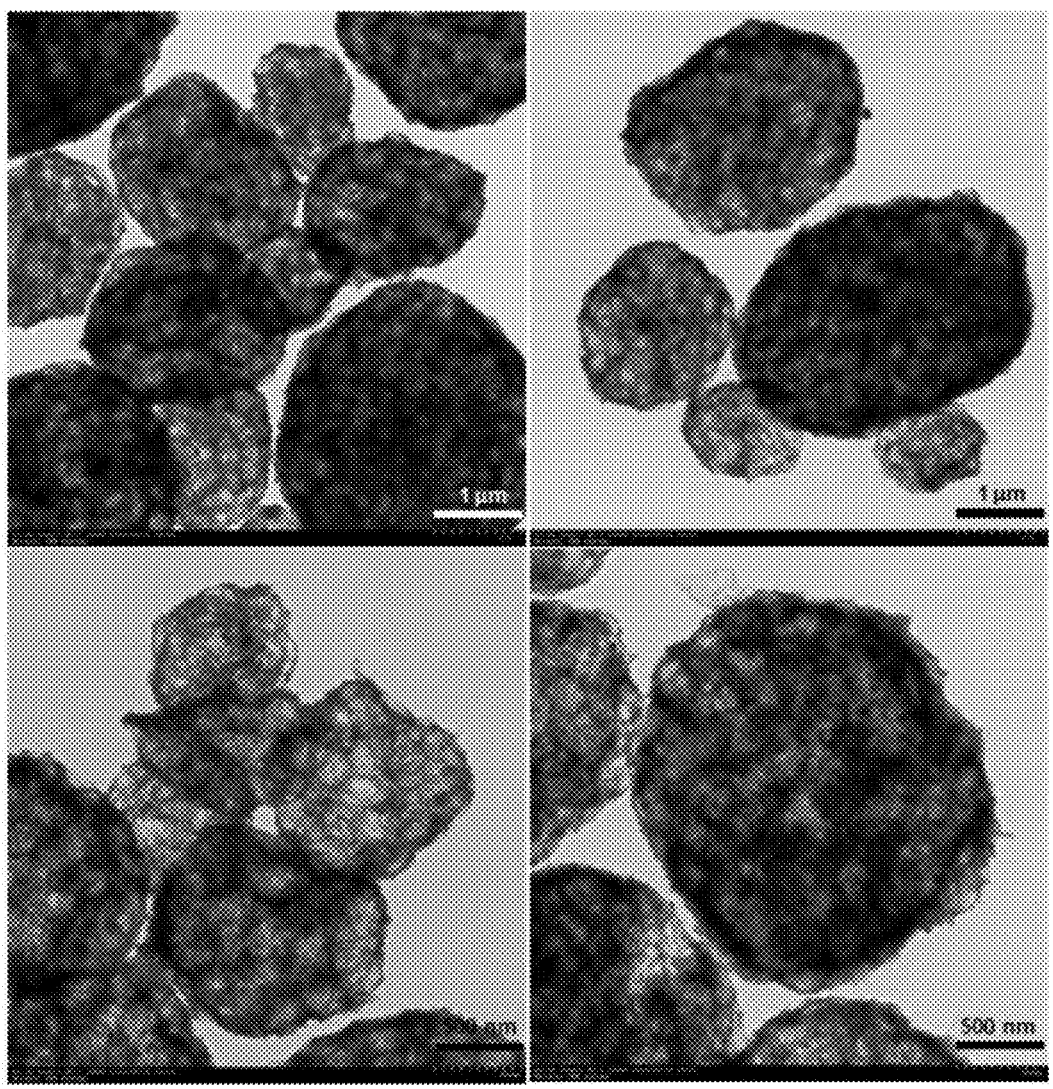

[Fig. 9a]
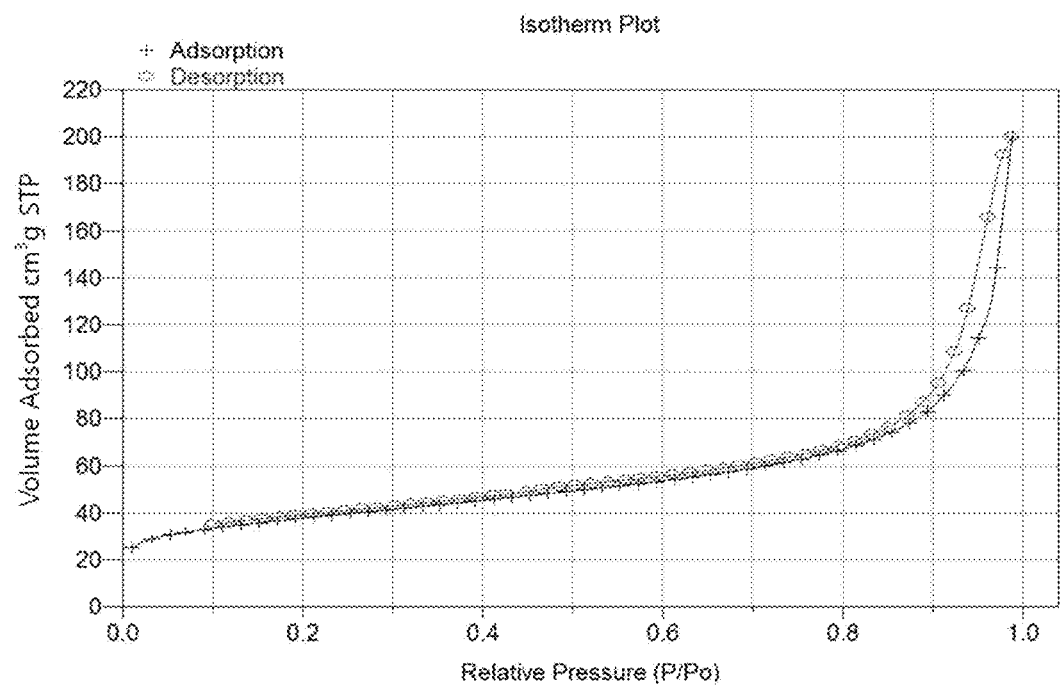
[Fig. 9b]
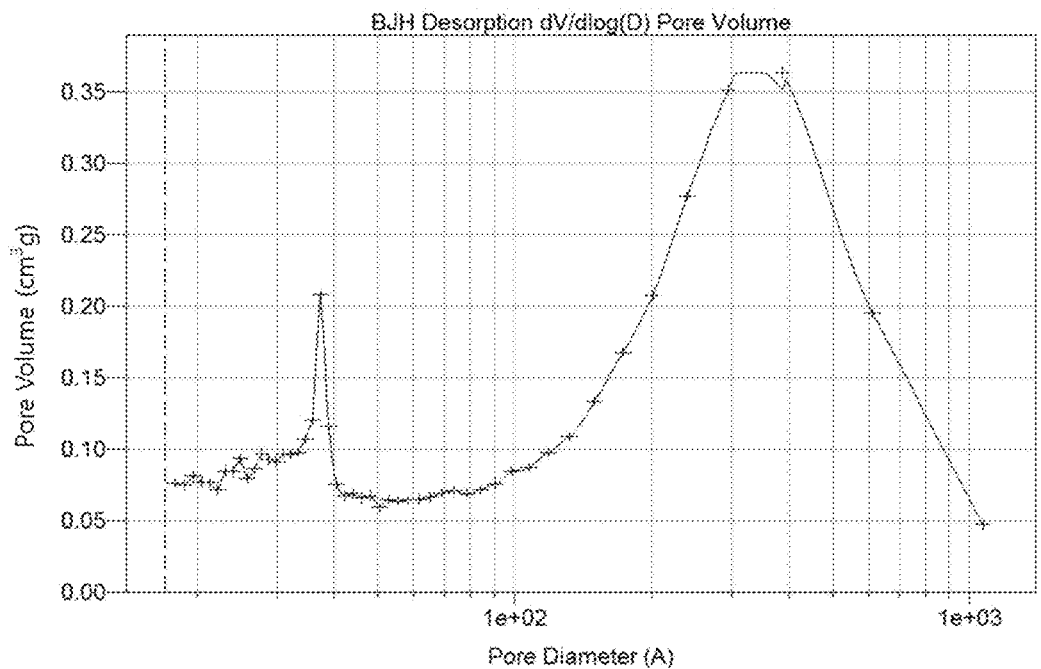

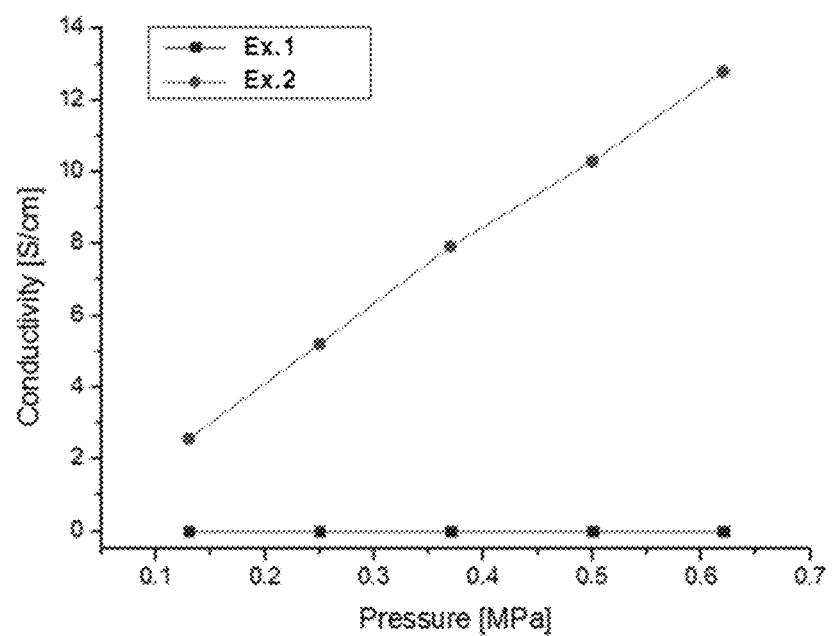
[Fig. 10]

METHOD FOR PRODUCING HOLLOW CARBON CAPSULES

CROSS-REFERENCE TO RELATED APPLICATION(S)

The present application is a National Stage Application No. PCT/KR2015/010295, filed Sep. 30, 2015, and claims the benefit of priority based on Korean Patent Application No. 10-2014-0131859 filed on Sep. 30, 2014, Korean Patent Application No. 10-2014-0131860 filed on Sep. 30, 2014 and Korean Patent Application No. 10-2015-0137058 filed on Sep. 25, 2015, all of which are hereby incorporated by reference in their entirety for all purposes as if fully set forth herein.

TECHNICAL FIELD

The present invention relates to a production method capable of mass-producing hollow carbon capsules.

BACKGROUND ART

A hollow carbon capsule refers to a particle having an empty pore inside and a shell forming the pore which is composed of carbon. The hollow carbon capsule has a large surface area due to the pore therein and the pore can serve as a storage space. Thus, the hollow carbon capsule has a wide range of applications such as adsorbents, hydrogen storage materials, additives, catalyst supports, and lubricants, etc.

The principle of producing the hollow carbon capsule is to form a structure consisting of a template core and a carbon precursor shell, and then to remove the template. Here, it is largely classified into a method of using a hard template and a method of using a soft template depending on the type of template used.

The method of using a hard template is a method of using an inorganic material of silica or metal oxide as a template. Since the hard template hardly undergoes a change in shape during carbonization, it has advantages in that the pore structure can be easily maintained and that the shape of the pore can be easily adjusted by adjusting the shape of the hard plate. However, because the hard template must be removed after forming the carbon shell by the carbonization process, the formation of the shell and the formation of the pore are divided into two stages. In general, the hard template is removed with a toxic acidic or basic substance, and thus it may pose environmental problems.

The method of using a soft template is a method of using an organic material capable of thermal decomposition as a template such as a polymer. Because the template in the carbonization process is thermally decomposed and removed, and at the same time the carbonization of the carbon precursor occurs, the process is simple, and also toxic substances are not used, thereby posing fewer environmental problems, which is advantageous. However, because the thermal decomposition and carbonization of the polymer occur simultaneously, the shape of the pore formed can easily collapse, and thus care should be taken in selecting the materials, compared to the method of using the hard template.

The method of using the soft template has to consider two points: one is to produce particles of the core portion composed of the soft template and the shell portion composed of carbon precursor before the carbonization process, and the other is the materials of the soft template and carbon precursor.

Conventionally, a method for producing hollow carbon particles comprising sulfonating the surface of polystyrene particles, allowing aniline to be modified thereon, polymerizing aniline to form a core (polystyrene)/shell(polyaniline) structure, and subjecting it to heat treatment has been reported (DAI Xiao-ying et al., New Carbon Materials, 2011, 26(5): 389-395). However, because the method above uses a sulfonation method, sulfuric acid and the like must be used, thereby posing environmental problems, and it is not suitable for a mass production method.

In addition, the selection of the materials for the soft template and carbon precursor is important, and if the thermal properties of two materials are similar, the shape of the pore formed is likely to collapse, so additional steps are required. In one example, there has been reported a method for producing hollow carbon particles by carbon-coating the surface of the polystyrene particles with glucose having similar thermal properties to form a core (polystyrene)/shell (carbon) structure and subjecting it to heat treatment (Robin J White et al., J. Am. Chem. Soc., 2010, 132: 17360-17363). However, the method above requires a pretreatment with glucose for about 24 hours in an autoclave to form a carbon shell, and thus is not suitable for a mass production method due to a long processing time. Therefore, the thermal properties of the soft template and the carbon precursor must be distinguished. In addition, the carbon precursor forms the carbon shell, and thus materials capable of highly maintaining the structure of the formed carbon shell should be selected.

Accordingly, there is a need for a method for producing hollow carbon capsules which is suitable for a mass production while using a soft template and which can highly maintain the shape of the pore.

The present inventor have studied a method for mass production of hollow carbon capsules, and found that hollow carbon capsules can be simply and effectively produced when using polymer particles as soft templates as well as a spray-drying method, thereby completing the present invention.

DETAILED DESCRIPTION OF THE INVENTION

Technical Problem

It is an object of the present invention to provide a production method which can simply and effectively produce hollow carbon capsules.

It is another object of the present invention to provide hollow carbon capsules produced by the production method above.

Technical Solution

To achieve the above objects, the present invention provides a method for producing hollow carbon capsules comprising the steps of:

producing a spray solution comprising carbon precursors, polymer particles and a solvent (Step 1);

producing particles by spraying and drying the spray solution (Step 2); and heat-treating the particles and carbonizing the carbon precursors to remove the polymer particles (Step 3).

As used herein, the term "hollow carbon capsules" refers to particles having a core/shell structure in which the core portion is composed of empty pores and the shell portion is composed of carbon. In addition, the hollow carbon capsules produced in the present invention can be produced in the form of being clumped together. When they are produced in the form of being clumped together, each shell has a structure which is connected to another shell. An example of the hollow carbon capsules according to the present invention is shown in FIG. 6.

There are pluralities of pores in the hollow carbon capsules, and because these pores give rise to a large surface area and an inner storage space, they can be applied to adsorbents, hydrogen storage materials, additives, catalyst supports and lubricants, etc.

The principle of producing hollow carbon capsules according to the present invention is to produce particles of the core/shell structure and then to remove the core materials while maintaining the structure of the shell simultaneously. That is, the removal of the core materials and the formation of the carbon shell must occur at the same time through heat treatment. Accordingly, the present invention is characterized by using the carbon precursors as shell materials and the polymer particles as core materials, spray-drying them to produce particles of a core/shell structure, and heat-treating the particles to produce hollow carbon capsules.

First, Step 1, which is a step of producing a spray solution for spraying and drying, is a step of producing a spray solution comprising carbon precursors, polymer particles and a solvent.

A polymer of the polymer particles that may be used herein may include one or more selected from polystyrene, poly(methyl methacrylate), polypropylene, polyethylene, polyurethane, polyvinyl alcohol, polyvinyl acetate or ethylene-vinyl acetate. Preferably, the polymer of the polymer particles is polystyrene. The polymer particles may be easily purchased commercially, and in the case of polystyrene particles, they can be easily produced by an emulsion polymerization method. The emulsion polymerization method may comprise a step of adding polystyrene monomers and an emulsifier to a solvent; and a step of performing polymerization by adding an initiator. Water may be used as the solvent, and SDS (sodium dodecyl sulfate) may be used as the emulsifier. The emulsion polymerization method has advantages in that the size of the polystyrene particles can be adjusted by controlling the content of the emulsifier and the monomer.

The carbon precursors are characterized in that they are crosslinked at a temperature lower than the temperature of the thermal decomposition of the polymer particles. That is, the carbon precursors and the polymer particles have different thermal behaviors depending on the temperature.

For example, as shown in FIG. 2 (Experimental Example 1), it can be confirmed that the polystyrene particles are thermally decomposed at 400 to 450° C., but in the case of lignosulfonate, which is an example of the carbon precursors that can be used in the present invention, about 45% by weight of carbon remains. Accordingly, when the two materials have a core/shell structure, as shown in FIG. 3 (Experimental Example 2), the shell is first formed while the carbon precursors are crosslinked at around 200° C., and then the thermal decomposition of the polymer particles occurs at 400 to 450° C. Through this, all polymers in the core portion are thermally decomposed to convert an occupied space into a vacant pore, and the carbon precursors in the shell portion are carbonized to form a carbon shell. Further, a mesopore may be formed in the cell while the carbon precursor is carbonized.

Furthermore, one or more of the carbon precursors may be used, and it may be preferable to use a material which has aromaticity and is water soluble. Examples of the carbon precursors having the characteristics above include lignosulfonate, tannic acid, gallic acid, vanillic acid, dopamine, folic acid, caffeic acid, rosmarinic acid, chlorogenic acid, ferulic acid, sinapinic acid, ellagic acid and ellagitannins. Examples of the ellagitannins include castalagin, castalin, casuarictin, grandinin, punicalagin, punicalin, roburin A, tellimagrandin, and terflavin B. Preferably, lignosulfonate may be used as the carbon precursor.

The diameter of the polymer particles corresponds to the pore diameter of the hollow carbon capsules finally produced, and may be appropriately selected according to the use. Preferably, the polymer particles having a diameter of 10 nm to 20,000 nm may be used.

As the solvent of the spray solution, water may be used. The weight ratio of the carbon precursors and the polymer particles in the spray solution is preferably 0.07:3 to 70:3. The thickness of the carbon shell may be adjusted by controlling the content of the carbon precursors. The higher the carbon precursor content, the thicker the carbon shell becomes. Further, it is preferable to stir the spray solution so that the carbon precursors can be well adsorbed to the surface of the polymer particles.

Furthermore, in Step 1, the spray solution may further comprise carbon nanotubes.

When the carbon nanotubes are used together, the carbon nanotubes remains during the heat treatment, which will be described later, and thus, the structure of the carbon shell can be stably maintained, and the electrical conductivity and mechanical properties can be improved by inherent characteristics of the carbon nanotubes.

The carbon nanotubes may be single wall carbon nanotubes, double wall carbon nanotubes and multiwall carbon nanotubes. The length of the carbon nanotubes is preferably 0.5 μm to 50 μm. The spray solution containing the carbon nanotubes is preferably ultrasonically treated such that the carbon nanotubes can be well dispersed in the spray solution. The weight ratio of the carbon nanotubes and the carbon precursors in the spray solution is preferably 1.5:1 to 10:1.

Step 2 above, which is a step of producing particles of a core/shell structure, is a step of producing the particles by spraying and drying the spray solution produced in Step 1.

The spray-drying method is a method widely used in the production of foods, medicines, ceramics, etc., and uniformly produces spherical particles of a desired size, and thus, it is suitable for a mass production method because no additional processing is required.

When the spray solution produced in Step 1 is sprayed, the carbon precursors are adsorbed onto the surface of the polymer particles having a large surface area, and then are dried to produce the particles of the core/shell structure. Accordingly, the polymer particles form the core portion, and the carbon precursors form the shell portion. In addition, when the particles of the plurality of core/shell structures are clumped together, they generally become close to a sphere in shape.

Step 3 above, which is a step of finally producing hollow carbon capsules, is a step of heat-treating the particles produced in Step 2 and carbonizing the carbon precursor to remove polymer particles.

Through the heat treatment above, the polymer particles are removed by thermal decomposition to form empty pores, and the carbon precursors are carbonized to form the carbon shell. The heat treatment temperature is adjusted to a temperature at which the polymer particles are thermally decomposed and the carbon precursors are carbonized. Preferably, the heat treatment is performed at a temperature of 200 to 350° C. for a primary treatment, and at a temperature of 400 to 600° C. for a secondary treatment.

The temperature for the primary treatment is a temperature at which the carbon precursors are thermally polymerized, and a strong carbon shell can be formed through the primary treatment. The temperature for the secondary treatment is a temperature at which the polymer particles are thermally decomposed, and the pores can be formed by removing the polymer particles through the secondary treatment. The primary temperature and the secondary temperature may be independently applied, or a method of gradually raising the temperature to a range of temperatures including both the primary temperature and secondary temperature may be applied. Preferably, the temperature is raised from room temperature (25° C.) to the range of 400 to 600° C., and the heat treatment is preferably performed at 400 to 600° C. for 2 hours. The temperature is preferably raised at 10° C./min.

Further, as described above, in case of additionally using the carbon nanotubes in Step 1 above, as the carbon nanotubes remain intact, the structure of the carbon nanotubes, which are intricately intertwined, is maintained, and thus, the empty pores formed as the polymer particles are removed by thermal decomposition can be stably maintained. Furthermore, due to the carbon nanotubes, electrical conductivity and mechanical strength can be imparted to the hollow carbon capsules, and accordingly, the shape thereof can be stably maintained even when the hollow carbon capsules are used under harsh conditions.

Because the method for producing hollow carbon capsules according to the present invention uses the spraying and drying method to form the core/shell structure, it is advantageous in that it poses fewer environmental problems due to no use of toxic substances and that is suitable for a mass production method. Further, since the spray solution is an aqueous solution, substances that are well dispersed in water may be applied in order to change the characteristics of the hollow carbon capsules to be produced.

Furthermore, because the formation of pores and the formation of carbon shell can occur simultaneously by using the polymer particles which are soft templates, it has advantages in that the process is simple. Furthermore, materials which are inexpensive and easy to handle may be used for the carbon precursors, thereby enabling an easy process and reducing the production cost.

In addition, the present invention provides hollow carbon capsules produced by the production method above. An example of the hollow carbon capsules produced according to the present invention is shown in FIG. 6.

In the hollow carbon capsules, the inner pore has a diameter of 10 nm to 20,000 nm. Further, the carbon shell has a thickness of 1 nm to 1,000 nm. Furthermore, when the hollow carbon capsules are produced in the form of being clumped together, the diameter of the entire hollow carbon capsules is 12 nm to 22,000 nm.

The hollow carbon capsules produced according to the present invention is characterized in that the pores are uniformly formed by the solid shell and that the spherical shape of the shell is highly maintained without collapse. Accordingly, the hollow carbon capsules produced according to the present invention can be used as adsorbents, hydrogen storage materials, additives, catalyst supports, lubricants, etc., by utilizing a large surface area and inner space.

Advantageous Effect

The method of producing hollow carbon capsules according to the present invention can simply and effectively produce hollow carbon capsules by using polymer particles as soft templates and using a spray-drying method.

BRIEF DESCRIPTION OF THE DRAWINGS

FIG. 1 schematically shows the method for producing hollow carbon capsules of the present invention.

FIG. 2 is a graph showing the TGA results of polystyrene (PS) and lignosulfonate (LS).

FIG. 3 is a graph showing the TGA results of the hollow carbon capsule according to an embodiment of the present invention.

FIG. 4 shows graphs illustrating the BET surface area and pore distribution (FIG. 4*a*), and isotherm plot (FIG. 4*b*) of the hollow carbon capsule according to an embodiment of the present invention.

FIG. 5*a* shows polystyrene particles, FIG. 5B shows the particles of PS core/LS shell before heat treatment and FIG. 5C shows the particles of PS core/LS shell after heat treatment.

FIG. 6 shows the pore and carbon shell of the hollow carbon capsule according to an embodiment of the present invention.

FIG. 7 is an SEM image of the hollow carbon capsule according to an embodiment of the present invention.

FIG. 8 is a TEM image of the hollow carbon capsule according to an embodiment of the present invention.

FIG. 9 shows graphs illustrating the BET surface area (FIG. 9*a*) and pore distribution (FIG. 9*b*) of the hollow carbon capsule according to an embodiment of the present invention.

FIG. 10 is a graph showing the measurement result of powder resistance of the hollow carbon capsule according to an embodiment of the present invention.

DETAILED DESCRIPTION OF THE EMBODIMENTS

Hereinafter, the present invention will be described in more detail by way of Examples below. However, these Examples are given for illustrative purposes only, and the scope of the invention is not intended to be limited by these Examples.

Production Example: Production of Polystyrene Particles

Prior to the production of the hollow carbon capsules according to the present invention, polystyrene particles used as soft templates were produced.

Specifically, 0.1 g of sodium dodecyl sulfate (SDS) was added to 90 mL of distilled water, and then SDS was dissolved by stirring (300 rpm) while raising the temperature to 80° C. 10 g of styrene was added to the solution and mixed for 10 minutes. 0.1 g of potassium persulfate (KPS) which is an initiator was completely dissolved in 10 mL of distilled water, and this was added to the solution in which styrene was dissolved and then subject to a polymerization reaction for 6 hours to produce polystyrene particles in a sol state (10 wt % PS sol.). The produced polystyrene particles are shown in FIG. 5(a), and the diameter of the particles was about 200 nm.

Example 1: Production of Hollow Carbon Capsules

1) Production of Hollow Carbon Capsules

The method for producing hollow carbon capsules according to the present invention is schematically shown in FIG. 1.

Specifically, 1 g of lignosulfonate was added to 200 mL of distilled water and completely dissolved using bath sonication. To this solution, 30 mL of 10 wt % PS sol. produced in Production Example above was added and mixed with a homogenizer to produce a spray solution. The spray solution was sprayed and dried in a spray dryer (outlet temp.: 180° C., aspirator: 95%, feeding rate: 15%), heated to a temperature of 600° C. at a rate of 10° C./min in a tube furnace and then subject to calcination for 2 hours (Ar condition) to produce hollow carbon capsules.

2) Thermogravimetric Analysis

A thermogravimetric analysis was performed to confirm the behavior of lignosulfonate and polystyrene according to the temperature in the heat treatment process.

Specifically, the weight of lignosulfonates (LS) and the polystyrene particles used above was independently measured according to the temperature, and the results are shown in FIG. 2. As shown in FIG. 2, lignosulfonate (LS) showed a constant mass loss with increasing temperature, and as the thermal polymerization occurred at about 200 to 350° C., about 45% by weight of carbon remained after the whole process. On the other hand, in the case of polystyrene (PS), a mass loss did not occur with increasing temperature, but a rapid mass loss occurred at about 400 to 450° C., and most of polystyrene was thermally decomposed at about 450° C. or higher.

From the results above, it was confirmed that the thermal properties of the lignosulfonate and polystyrene were different, and that the lignosulfonate could be thermally polymerized before the temperature at which all of the polystyrene was thermally decomposed.

3) Thermogravimetric Analysis

This experiment was carried out in the same manner as in the thermogravimetric analysis above, except that the particles produced by spraying and drying in Example above were used to measure the weight according to the temperature, and the results are shown in FIG. 3.

As shown in FIG. 3, a rapid mass loss was observed at around 400° C. due to the polystyrene core. However, it was confirmed that as lignosulfonate was thermally polymerized, not all particles thereof were decomposed, and about 11% by weight thereof finally remained, and it was also confirmed that the remaining materials formed the shell of the hollow carbon capsules.

The results above are consistent with the results of FIG. 2. Specifically, the particles produced by spraying and drying in Example above contained 25% by weight of lignosulfonate (PS/LS=3/1). According to FIG. 2, it can be assumed that all of polystyrene was removed after the whole process, and that about 45% by weight of carbon remained in the case of lignosulfonate. Therefore, the content of lignosulfonate in the finally produced hollow carbon capsules is theoretically about 11% by weight (0.25×0.45), and this is consistent with the results shown in FIG. 3

4) Measurement of Specific Surface Area and Pore Volume of Hollow Carbon Capsules The specific surface area and pore volume of the hollow carbon capsules produced above were measured as shown in FIG. 4. As a result, the BET surface area was measured as 126.9483 $m^2/g$, and the pore volume was measured as 0.328744 $cm^3/g$.

5) Observation of Hollow Carbon Capsules

The hollow carbon capsules produced above were observed under a microscope and are shown in FIG. 5. For comparison, the polystyrene particles and the core/shell particles before the heat treatment process were also observed.

FIG. 5 (a) shows the polystyrene particles before spraying which are spherical particles having a diameter of about 200 nm. FIG. 5 (b) shows the core/shell particles before the heat treatment process, whose total diameter was about 1000 to 3000 nm and in which the polystyrene particles were observed inside. FIG. 5 (c) shows the hollow carbon capsules after the heat treatment process in which the pores were observed in the space from which the polystyrene was removed, and it was observed that the shape of the carbon shell was highly maintained without collapse.

Further, the hollow carbon capsules were more closely observed under a microscope and are shown in FIG. 6. As shown in FIG. 6a, spherical hollow carbon capsules were generally observed, and it was confirmed that pores were present inside. Furthermore, as shown in FIG. 6b, it was confirmed that the thickness of the shell was about 20 nm.

Example 2: Production of Hollow Carbon Capsules Containing Carbon Nanotubes

1) Production of Hollow Carbon Capsules Containing Carbon Nanotubes 1.5 g of CNT (HYOSUNG, 10 to 30 μm) and 2.5 g of PSS-Li aqueous solution (Aldrich, 30 wt %) were added to 125 mL of distilled water and then ultrasonically treated for 3 times within 10 minutes to produce a carbon nanotube aqueous dispersion. 1 g of lignosulfonate was added to 150 mL of distilled water, completely dissolved using bath sonication, and then added to the carbon nanotube aqueous dispersion. To this, 30 mL of 10 wt % PS sol. produced in Production Example above was added and mixed with a homogenizer to produce a spray solution. The spray solution was sprayed and dried with a spray dryer (outlet temp.: 180° C., aspirator: 95%, feeding rate: 15%), heated to a temperature of 600° C. at a rate of 10° C./min in a tube furnace and then subjected to calcination for 2 hours (Ar condition) to produce hollow carbon capsules.

2) Observation of Hollow Carbon Capsules

The hollow carbon capsules produced in Example above were observed under a microscope, and SEM images are shown in FIG. 7 and TEM images are shown in FIG. 8, respectively.

As shown in FIG. 7, it was confirmed that the shape of the pores was well maintained even after the carbonization, and the pore diameter was about 200 to 220 nm, which was almost identical to the diameter of the polystyrene particles produced in Production Example. From this, it was confirmed that the shape of the space from which the polystyrene particles were removed was well maintained as a pore.

Further, as shown in FIG. 8, it can be confirmed that the pore structure was maintained in a state where the carbon nanotubes are intertwined in the hollow carbon capsules.

3) Measurement of Specific Surface Area and Pore Volume of Hollow Carbon Capsules The specific surface area and pore volume of the hollow carbon capsules produced in Example above were measured as shown in FIG. 9. As a result, the BET surface area was measured as 133.5264 m²/g, and the pore volume was measured as 0.309500 cm³/g.

4) Measurement of Powder Resistance of Hollow Carbon Capsules

The powder resistance of the hollow carbon capsules produced in Example above was measured. For comparison, the powder resistance of the hollow carbon capsules produced in Example 1 was also measured.

Specifically, 1 g of each hollow carbon capsule was added to a powder holder, and a cylindrical bar was added. This was installed with a powder resistivity measurement system (HPRM-1000, Hantek), and then the sheet resistance, electrical conductivity and packing density were measured while pressing the cylindrical bar with a constant pressure.

The results are shown in FIG. 10 and Table 1 below.

TABLE 1

| Load (kg) | Press (Mpa) | Example 1 Conductivity (S/cm) | Example 1 Packing density (g/cc) | Example 2 Conductivity (S/cm) | Example 2 Packing density (g/cc) |
|---|---|---|---|---|---|
| 400 | 0.13 | $5.42 \times 10^{-5}$ | $3.26 \times 10^{-1}$ | 2.57 | $3.92 \times 10^{-1}$ |
| 800 | 0.25 | $1.08 \times 10^{-4}$ | $4.44 \times 10^{-1}$ | 5.21 | $5.57 \times 10^{-1}$ |
| 1200 | 0.37 | $1.56 \times 10^{-4}$ | $5.44 \times 10^{-1}$ | 7.93 | $7.33 \times 10^{-1}$ |
| 1600 | 0.5 | $2.00 \times 10^{-4}$ | $6.26 \times 10^{-1}$ | 10.3 | $8.79 \times 10^{-1}$ |
| 2000 | 0.62 | $2.52 \times 10^{-4}$ | $7.24 \times 10^{-1}$ | 12.8 | 1.03 |

As shown in FIG. 10 and Table 1, the hollow carbon capsules of Example 2 containing carbon nanotubes exhibited an electrical conductivity that is about $10^5$ times higher than those of Example 1 without containing carbon nanotubes. Based on this, it could be confirmed that, when using the carbon nanotubes, the hollow carbon capsules according to the present invention exhibited significantly improved electric conductivity by forming a conductive pathway in the inside and outside due to the carbon nanotubes.

In addition, it was confirmed that the electric conductivity was improved as the measurement pressure was increased in both Examples 1 and 2.

The invention claimed is:

1. A method for producing hollow carbon capsules comprising the steps of:
    producing a spray solution comprising carbon precursors, polymer particles, carbon nanotubes and a solvent;
    producing particles by spraying and drying the spray solution; and
    heat-treating the particles at a temperature of 200° C. to 350° C. for a primary treatment, and at a temperature of 400° C. to 600° C. for a secondary treatment, to form a carbon shell by carbonizing the carbon precursors and removing the polymer particles,
    wherein the carbon precursors are cross-linked at a temperature lower than a thermal decomposition temperature of the polymer particles, and
    wherein the hollow carbon capsules are particles comprising the carbon shell surrounding an empty pore.

2. The method for producing hollow carbon capsules of claim 1, wherein the carbon precursor is one or more selected from the group consisting of lignosulfonate, tannic acid, gallic acid, vanillic acid, dopamine, folic acid, caffeic acid, rosemary acid, chlorogenic acid, ferulic acid, sinapinic acid, ellagic acid, castalagin, castalin, casuarictin, grandinin, punicalagin, punicalin, roburin A, tellimagrandin and terflavin B.

3. The method for producing hollow carbon capsules of claim 1, wherein a polymer of the polymer particles is one or more selected from the group consisting of polystyrene, poly(methyl methacrylate), polypropylene, polyethylene, polyurethane, polyvinyl alcohol, polyvinyl acetate and ethylene-vinyl acetate.

4. The method for producing hollow carbon capsules of claim 3, wherein the polymer particles have a diameter of 10 nm to 20 μm.

5. The method for producing hollow carbon capsules of claim 1, wherein the carbon nanotubes have a length of 0.5 μm to 50 μm.

6. The method for producing hollow carbon capsules of claim 1, wherein the solvent is water.

7. The method for producing hollow carbon capsules of claim 1, wherein the weight ratio of the carbon precursors and the polymer particles is 0.07:3 to 70:3.

8. The method for producing hollow carbon capsules of claim 1, wherein the weight ratio of the carbon nanotubes and the carbon precursors is 1.5:1 to 10:1.

9. The method for producing hollow carbon capsules of claim 1, wherein the weight ratio of the carbon precursors and the polymer particles is 1:3 to 1:45.

10. The method for producing hollow carbon capsules of claim 1, wherein the hollow carbon capsules have a pore diameter of 10 nm to 20 μm.

11. The method for producing hollow carbon capsules of claim 1, wherein the hollow carbon capsules have a shell thickness of 1 nm to 1,000 μm.

* * * * *